United States Patent
Klein et al.

(10) Patent No.: US 11,794,545 B1
(45) Date of Patent: Oct. 24, 2023

(54) LIFT AXLE SUSPENSION SYSTEM FOR A HEAVY-DUTY VEHICLE, WHICH SUSPENSION SYSTEM USES X-ROD CONTROL ARMS FOR IMPROVED LATERAL STABILITY

(71) Applicants: Jason M. Klein, Springfield, MO (US); Kevin Schlack, Ozark, MO (US)

(72) Inventors: Jason M. Klein, Springfield, MO (US); Kevin Schlack, Ozark, MO (US)

( * ) Notice: Subject to any disclaimer, the term of this patent is extended or adjusted under 35 U.S.C. 154(b) by 0 days.

(21) Appl. No.: 17/706,895

(22) Filed: Mar. 29, 2022

Related U.S. Application Data

(60) Provisional application No. 63/167,289, filed on Mar. 29, 2021.

(51) Int. Cl.
*B60G 17/033* (2006.01)
*B60G 9/02* (2006.01)
(Continued)

(52) U.S. Cl.
CPC ........... *B60G 17/033* (2013.01); *B60G 7/001* (2013.01); *B60G 9/006* (2013.01); *B60G 9/02* (2013.01);
(Continued)

(58) Field of Classification Search
CPC ...... B60G 17/033; B60G 7/001; B60G 9/006; B60G 9/02; B60G 11/265; B60G 11/27;
(Continued)

(56) References Cited

U.S. PATENT DOCUMENTS

| 1,273,059 A | 7/1918 | Hild | F16F 9/20 |
| 2,890,063 A * | 6/1959 | Stover | B60G 21/06 |
| | | | 280/81.6 |

(Continued)

FOREIGN PATENT DOCUMENTS

| DE | 102017206206 A1 * | 10/2018 |
| KR | 101382635 B1 * | 4/2014 |

OTHER PUBLICATIONS

Li, Xiangbi et al., "Parameter Optimization on Asymmetry Orifice in a Differential Surge Chamber," Energy Procedia 16 (2012) 730-736, accessed online at https://www.researchgate.net/figure/a-symmetric-orifice-b-asymmetric-orifice-hydraulic-resistance-coefficient-under-ideal_fig3_257711565, on Jul. 1, 2021.

(Continued)

*Primary Examiner* — Drew J Brown
(74) *Attorney, Agent, or Firm* — Jonathan A. Bay

(57) ABSTRACT

A suspension system for liftable steerable axles has at least one steering knuckle; at least one pistonless bellows air spring actuator (ie., damper air spring); and a steering axle structure that has, at each end, a kingpin housing boss, a kingpin fixed into the kingpin boss, and a pair of steering knuckles that rotate around the kingpin and are supported by the kingpin housing; wherein the steering knuckles are connected at the bottom of each other side to side by a tie rod assembly that respond to each others rotational inputs. The lift axle suspension system further has x-rod control arms (or that is, the respective upper and lower control arms of each side are relatively X-configured or X-disposed relative each other) for improved lateral stability.

19 Claims, 15 Drawing Sheets

(51) Int. Cl.
*B60G 11/26* (2006.01)
*B60G 7/00* (2006.01)
*B60G 9/00* (2006.01)
*B60G 11/27* (2006.01)

(52) U.S. Cl.
CPC ............ *B60G 11/265* (2013.01); *B60G 11/27* (2013.01); *B60G 2202/152* (2013.01); *B60G 2204/41* (2013.01)

(58) Field of Classification Search
CPC .......... B60G 2202/152; B60G 2204/41; B62D 61/12
See application file for complete search history.

(56) References Cited

U.S. PATENT DOCUMENTS

| | | | |
|---|---|---|---|
| 3,716,249 A | 2/1973 | Schaeff | B62D 13/00 |
| 3,880,439 A | 4/1975 | Wolter | B62D 13/04 |
| 5,230,528 A * | 7/1993 | Van Raden | B62D 61/12 |
| | | | 280/86.757 |
| 5,620,194 A | 4/1997 | Keeler et al. | B62D 61/12 |
| 6,007,078 A | 12/1999 | Gottschalk | B62D 17/00 |
| 6,062,578 A | 5/2000 | Richardson | B60G 11/28 |
| 6,182,984 B1 | 2/2001 | Chalin | B62D 13/06 |
| 6,293,570 B1 * | 9/2001 | Gottschalk | B62D 7/144 |
| | | | 280/86.751 |
| 6,308,971 B1 * | 10/2001 | Mikaelsson | B60G 7/001 |
| | | | 280/124.17 |
| 6,398,239 B1 | 6/2002 | Chalin | B62D 7/144 |
| 6,796,566 B2 | 9/2004 | VanDenberg | B62D 61/125 |
| 6,880,839 B2 | 4/2005 | Keeler et al. | B62D 61/12 |
| 6,957,819 B2 | 10/2005 | Chalin et al. | B60G 9/00 |
| 7,445,220 B2 | 11/2008 | von Mayenburg | B60G 9/003 |
| 7,510,197 B2 | 3/2009 | Gottschalk | B60G 11/28 |
| 7,543,833 B2 * | 6/2009 | Lundmark | B60G 3/145 |
| | | | 280/124.13 |
| 7,748,724 B2 | 7/2010 | Gottschalk | B60G 9/003 |
| 8,403,346 B2 | 3/2013 | Chalin et al. | B60G 11/28 |
| 8,596,659 B2 | 12/2013 | Hudson | B62D 7/228 |
| 8,967,639 B2 * | 3/2015 | Conaway | B60G 11/28 |
| | | | 280/124.128 |
| 9,352,628 B2 | 5/2016 | Barton | B62D 61/12 |
| 9,481,416 B2 | 11/2016 | Conaway | B60G 11/28 |
| 9,664,148 B2 | 5/2017 | Foege | F02M 26/04 |
| 10,427,738 B2 | 10/2019 | Fowler et al. | B62D 61/12 |
| 10,471,988 B2 | 11/2019 | Westnedge et al. | B62D 7/228 |
| 10,543,730 B2 | 1/2020 | Davis | B60G 17/0408 |
| 10,569,814 B2 | 2/2020 | Hulstein et al. | B62D 61/12 |
| 2004/0178594 A1 * | 9/2004 | Keeler | B62D 61/12 |
| | | | 280/86.5 |
| 2004/0256820 A1 | 12/2004 | Chalin | B60G 9/00 |
| 2009/0206570 A1 | 8/2009 | Strong | B62D 61/12 |
| 2010/0213682 A1 * | 8/2010 | Luna | B60G 11/27 |
| | | | 280/124.153 |
| 2013/0033018 A1 * | 2/2013 | Kiselis | B60G 9/003 |
| | | | 29/428 |
| 2013/0270789 A1 * | 10/2013 | Fowler | B60G 7/001 |
| | | | 280/124.116 |
| 2015/0336436 A1 * | 11/2015 | Barton | B60G 9/003 |
| | | | 280/86.5 |
| 2018/0272819 A1 * | 9/2018 | Galla | B60G 7/001 |

OTHER PUBLICATIONS

Description of the "Prior Art Figures" section in U.S. Appl. No. 63/167,289, filed Mar. 29, 2021, entitled "Lift Axle Suspension Systems Using X-Rod Control Arms for Improved Lateral Stability"—Jason M. Klein et al.

* cited by examiner

LIFT AXLE SUSPENSION SYSTEM FOR A HEAVY-DUTY VEHICLE, WHICH SUSPENSION SYSTEM USES X-ROD CONTROL ARMS FOR IMPROVED LATERAL STABILITY

CROSS-REFERENCE TO PROVISIONAL APPLICATION(S)

This application claims the benefit of U.S. Provisional Patent Application No. 63/167,289, filed Mar. 29, 2021. The foregoing patent disclosure(s) is(are) incorporated herein by this reference thereto as if fully set forth next.

BACKGROUND AND SUMMARY OF THE INVENTION

The invention relates to heavy duty vehicle suspensions and, more particularly, to a lift axle suspension system for a heavy-duty vehicle wherein the suspension system uses X-rod control arms (or that is, the respective upper and lower control arms of each side are relatively X-configured or X-disposed relative each other) for improved lateral stability.

It is an object of the invention to improve lateral stability for a purpose of (among other purposes) lessening the wear and/or damage to the bushings at the control arm pivot connections (typically urethane or polyurethane bushings) or, in alternative reasoning, lengthening the longevity of the use life of such resilient material (eg., urethane or polyurethane) bushings.

Commonly-invented, commonly-owned, co-pending U.S. patent application Ser. No. 17/190,926, filed Mar. 3, 2021, entitled "PISTONLESS PNEUMATIC DAMPENING AND STRAIGHT CENTERING FOR A STEERABLE AXLE OF A HEAVY-DUTY VEHICLE," by Jason M. Klein et al., is also incorporated herein by this reference thereto as if fully set forth next.

FIG. 1 hereof shows a conventional heavy-duty vehicle 102 (eg., a dump truck) equipped with a pair of auxiliary liftable, steerable (self-steering) axles 104-05. Whereas the heavy-duty vehicle 102 is conventional, it is distinguished by being equipped with auxiliary liftable, steerable (self-steering) axles 104-05 in accordance with the invention.

The FIG. 1 dump truck has five axles 113, 104-05 and 114. The front axle 113 is characterized by the front steering system and front steering tires 117. (Note: many people in the industry will use the term "axle" on some occasions to informally refer to the full tire-wheel-suspension set (eg., 113 and 114), while on other occasions to the technically accurate component part that is the axle (eg., 104-05).) The second and third axles comprise auxiliary liftable, steerable (self-steering) axles 104-05 in accordance with the invention. The fourth and fifth axles 114 comprise fixed configuration ("primary") axles for the driven tires 118.

In FIG. 1, the wheels/tires 106 of the liftable steerable axles 104-05 are shown raised and locked in a lifted position (ie., lifted off and clear of the pavement 108, or tire-travel ground plane, of any composition). In the opposite direction, the liftable steerable axles 104-05 would be lowered and locked in a pavement-engaging position, ready for service for freighting load-bearing duty.

The front steering axle 113 is provided with the steering components for the dump truck 102 for positive steering of the vehicle 102. The tandem (two) rear 'primary' axles 114 are both driven and not steerable. These primary axles 114 are fixed in a forward orientation relative the longitudinal axis 116 of the dump truck. The tandem (two) auxiliary unpowered steerable axles 104-05 (and in accordance with the invention) are distinguished in providing for extra load-sharing (or load distribution) among the other axles 113 and 114 in situations for heavy loads.

The wheels/tires 106 of the steerable axles 104-05 are actually an example of unpowered caster wheels. And that's typical. They are called "steerable" (or "self steering") axles 104-05 in that, the caster wheels/tires 106 thereof, typical of caster wheels as on grocery carts or office chairs, self-steer or swivel perpendicular to the turning radius. For straight line motion, the turning radius can be reckoned as infinite and perpendicular to the straight line motion, whereby the caster wheel will then travel parallel to the direction of straight line travel (eg., axis 116).

Again, while called "steerable" (or "self steering") axles 104-05, "steerable" (or "self steering") does not equate with positive "steering."

Given the foregoing so far, a very brief background will make more sense now. These auxiliary steerable axles 104-05 can be installed on other heavy utility vehicles 102, not just dump trucks, but including without limitation certain types of flat bed trailers. Liftable steerable axles 104-05 are seen on cement mixers too but perhaps these are distinguished from what the inventors are most familiar with because those might be a standard option offered by the manufacturer of the cement mixer, which that manufacturer installs itself.

In contrast, in the inventors experience, most of the auxiliary axles (eg., 104-05) seen on dump trucks 102 are typically added as an after-market accessory. Some owner operators have been known build a DIY dump truck 102 out of an old semi-tractor 122. That is, these parties who are handy with tools and welding can take old semi-tractors 122, strip off the fifth wheel and any cabin quarters (if any), add a dump box 123 and then also add one or more auxiliary axles 104-05. It has been reported that, the authorities in an increasing number of states are encouraging the addition and utilization of such auxiliary axle suspensions 120, for reasons ranging from reducing wear and tear on roadway pavement 108, to, safer driving/cornering characteristics. Some states allow three auxiliary axle suspensions 120 in combination with the two primary axles 114. To the owner operators, reduction in tire wear is also an attractive factor.

The wheels/tires 106 on these auxiliary axles 104-05 are typically mounted as caster wheels, very much akin to the caster wheels on office chairs or the front of grocery carts. What allows a caster wheel to swivel is the characteristic which will be called here, the caster offset distance: namely, the small amount of offset distance between (1) the vertical shaft of an office chair or grocery cart (or nearly vertical kingpin of a steerable axle) and (2) the center (rolling) axis of the caster wheel. The caster wheels trail, like being 'towed' (sometimes in the industry the alternative term "plowed" is encountered). Caster wheels are self-steering (or swivel) perpendicular to a turning radius. And again, for straight line motion, the turning radius is reckoned as infinite and perpendicular to the straight line travel axis 116, whereby caster wheels then travel parallel to the direction of straight line travel.

With grocery carts or office chairs, it is readily permissible to push the cart or chair in one given direction of travel, and then reverse the direction to go the opposite way because those caster wheels (which can readily swivel 360°) will thus easily swivel 180° about their vertical shafts and again take the trailing position.

But unlike grocery carts or office chairs in which the wheels are mounted below a vertical shaft, the caster wheels/tires 106 of steerable auxiliary axles 104-05 for heavy duty-duty vehicles 102 not only (1) cannot swivel in 360° but also (2) are mounted on kingpins 126 that are not vertical but oriented on a 'caster' angle that is at somewhere like 5° to the forward position.

Note that, a wheel can be mounted on a caster 'angle,' but nevertheless, without the caster "offset" distance, it is not a "caster" wheel. 'Caster' angle aside, there are other factors limiting caster wheel/tire 106 swiveling on steerable axles 104-05 on a heavy-duty vehicle 102. One factor includes that the steering knuckle 129 will have limited angular articulation about the kingpin axis 131, another is that the tires 106 will bump against some portion of vehicle frame 111, and so on.

It is an object of the invention to improve lateral stability for swiveling caster wheels/tires 106 on steerable axles 104-05 of heavy-duty vehicles 102 for reducing/eliminating wear and damage to the resilient material bushings (eg., urethane or polyurethane bushings) at the pivot connections of the control arms 158 and 161 of the suspension 120.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
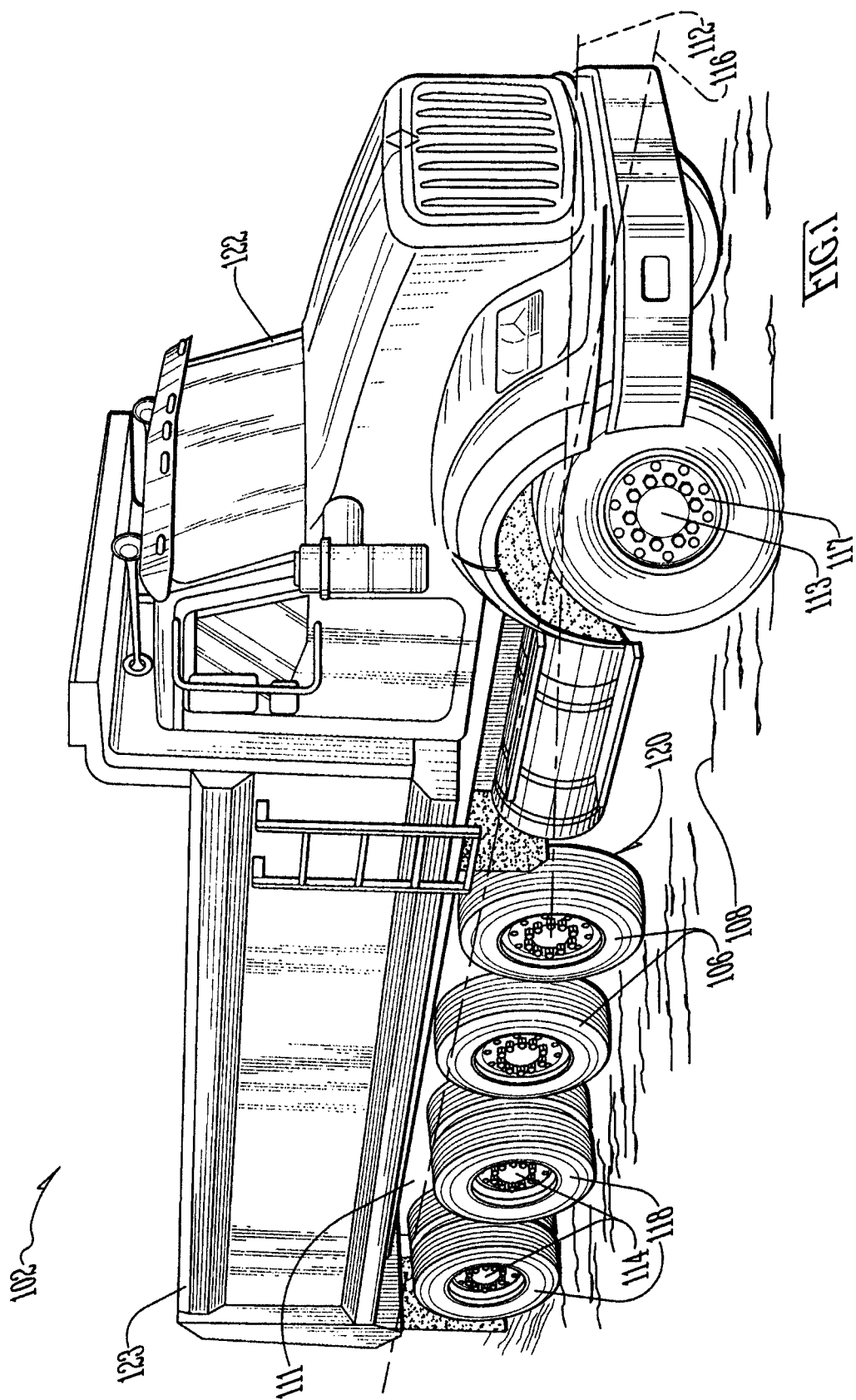
FIG. 1 is a perspective view of a conventional heavy-duty vehicle (a dump truck) equipped with a pair of liftable, steerable (self-steering) auxiliary axles in accordance with the invention, which suspension systems are provided with X-rod control arms (or that is, the respective upper and lower control arms on each side of the suspension system for the liftable and steerable (self-steering) auxiliary axles in accordance with the invention are configured such that the control arms are relatively X-configured or X-disposed relative each other), whereby for the purposes of improved lateral stability as well as for the purposes of extending the use life of the resilient (eg., urethane or polyurethane) bushings in the pivot connections of the control arms of the suspension.
Figure 2:
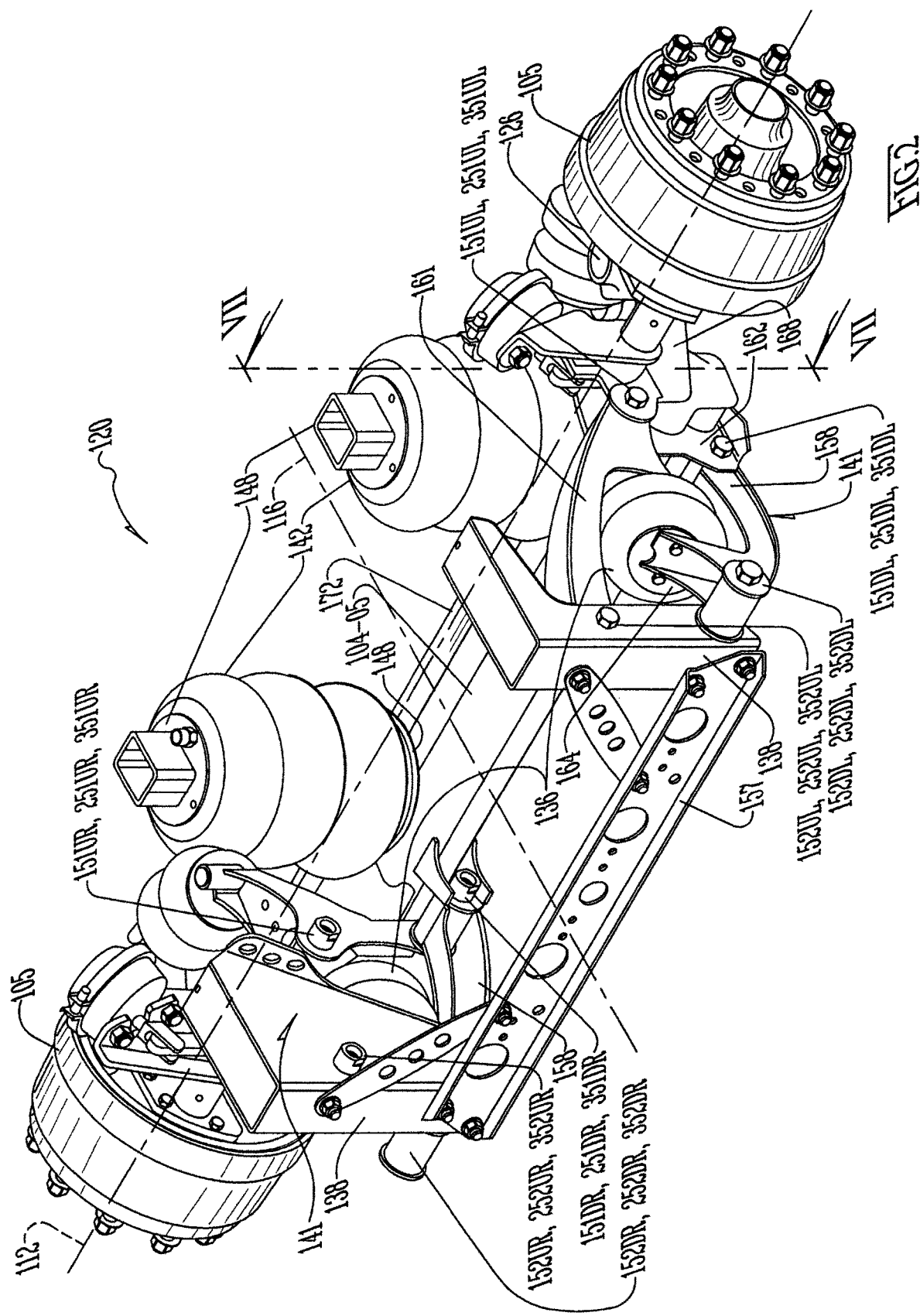
FIG. 2 is an upper as well as front and left (or port or US driver-side) perspective view of a lift axle suspension system for a heavy-duty vehicle using X-rod control arms in accordance with the invention, for improved lateral stability.
Figure 3:
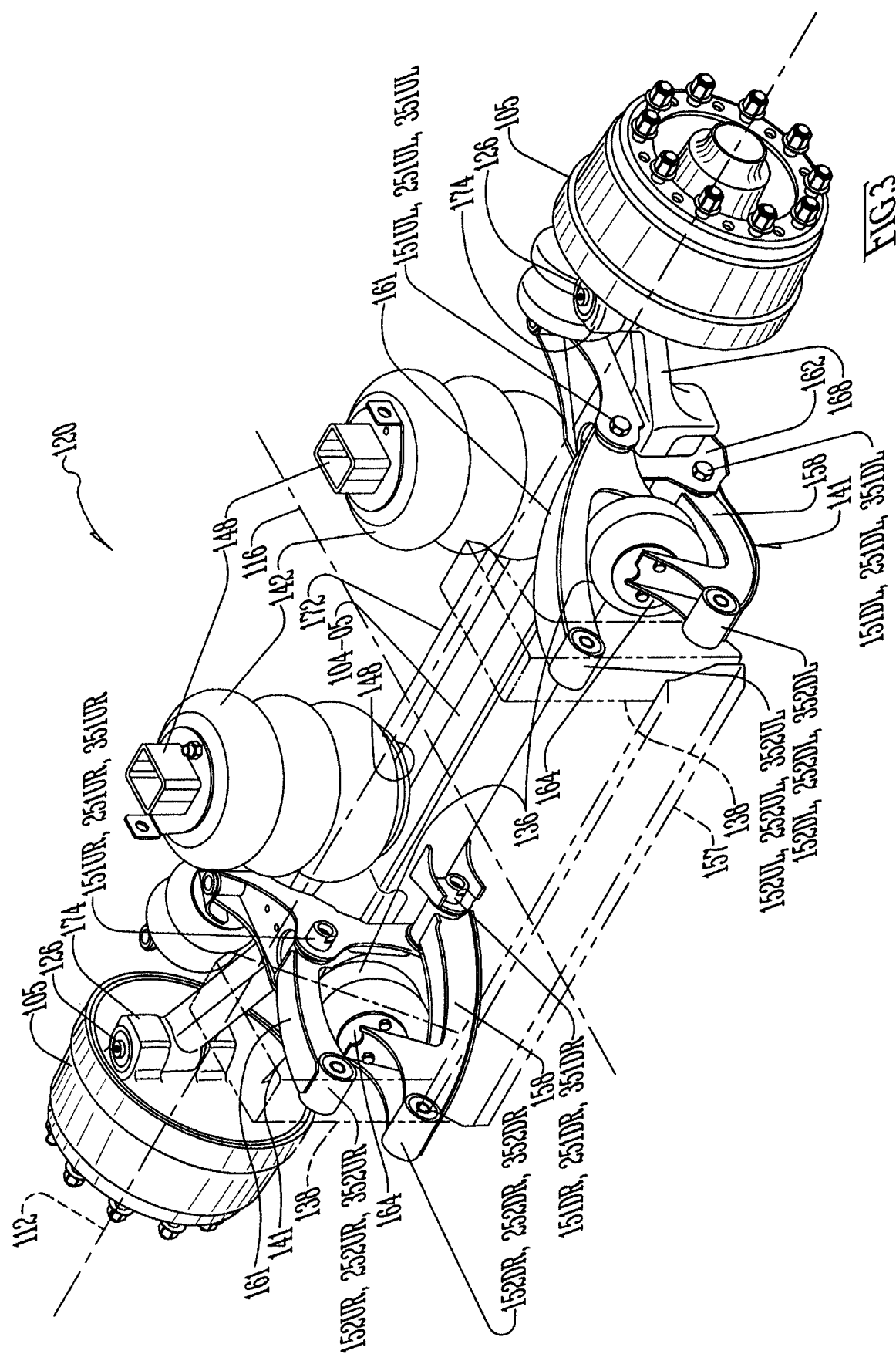
FIG. 3 is an upper as well as front and left (or port or US driver-side) perspective view comparable to FIG. 2 except wherein the left and right hanger brackets as well as the lateral bracing (or trussing members) therebetween are shown in hidden lines.
Figure 4:
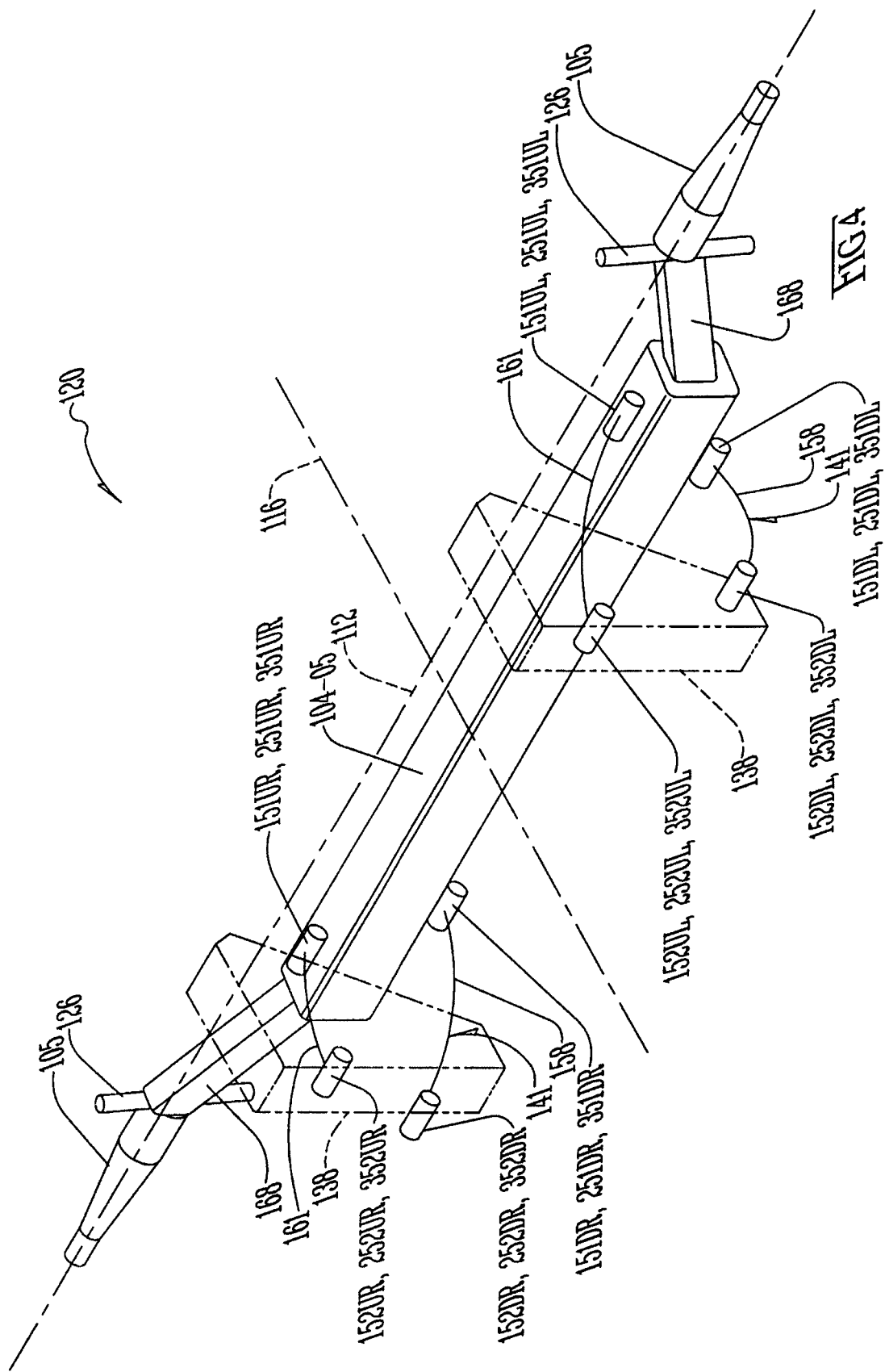
FIG. 4 is an upper as well as front and left (or port or US driver-side) perspective view comparable to FIGS. 2 and 3 except reduced to essentially a schematic view of articulation axes of the suspension system to better show the eight (8) bushing sleeves of the left and right upper and lower control arms as well as to show the left and right pivot axes for the left and right kingpins as well as to show the left and right tire-rotation axes for the spindles of the left and right tires.
Figure 5:
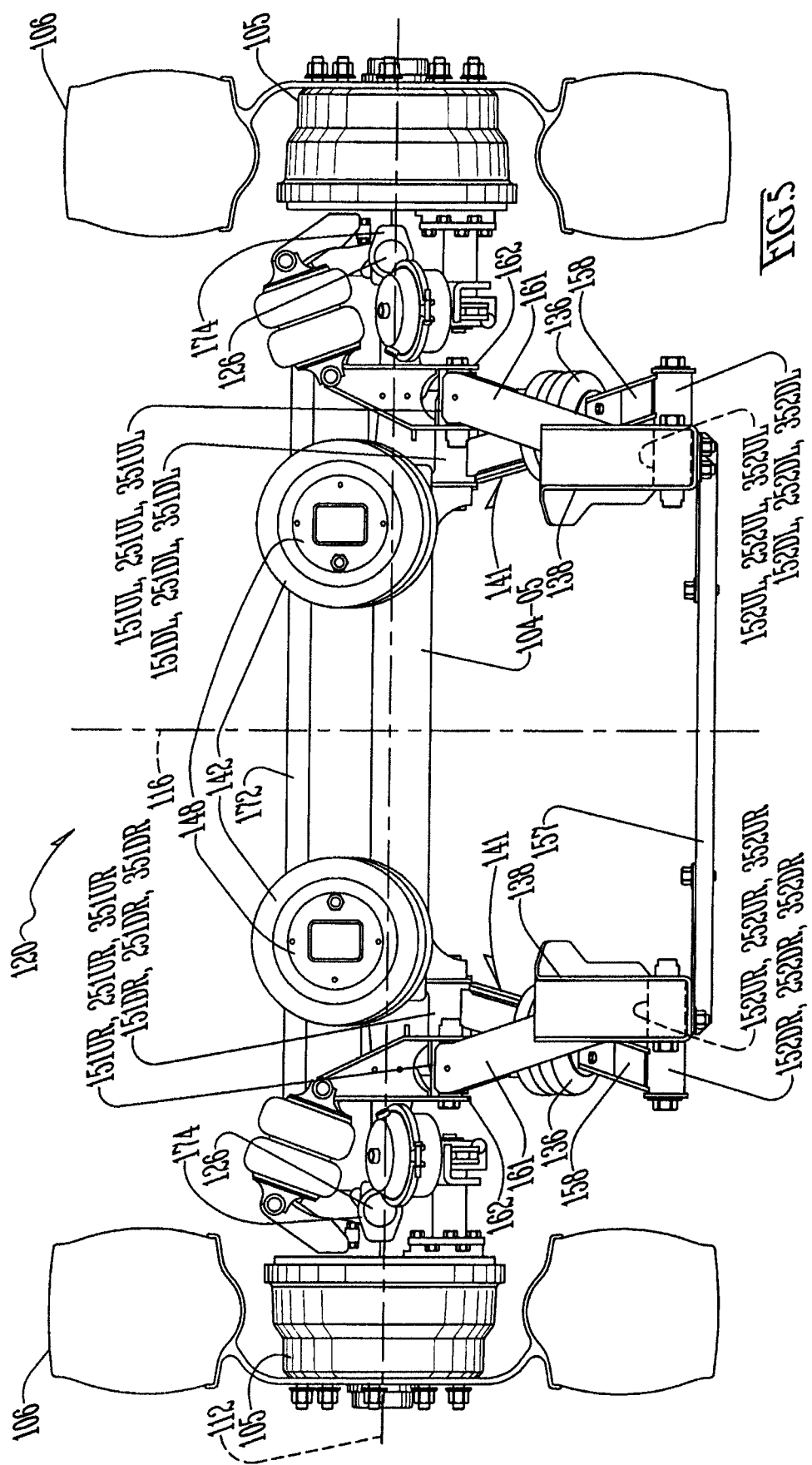
FIG. 5 is a top plan view of FIG. 2.
Figure 6:
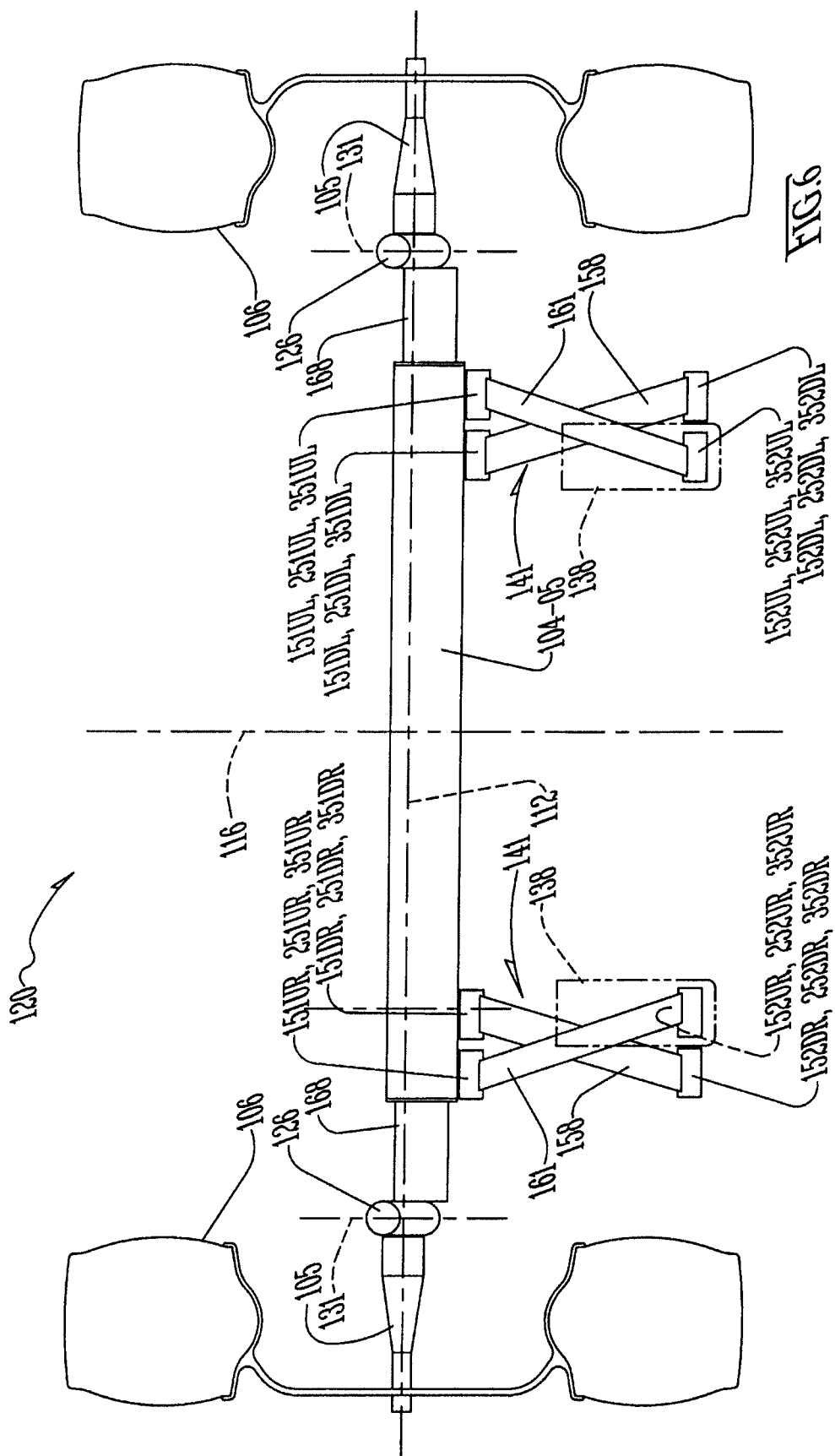
FIG. 6 is a top plan view comparable to FIG. 5 except, as like with FIG. 4, reduced to essentially a schematic view of articulation axes of the suspension system to better show the eight (8) bushing sleeves of the left and right upper and lower control arms as well as to show the left and right pivot axes for the left and right kingpins as well as to show the left and right tire-rotation axes for the spindles of the left and right tires.
Figure 7:
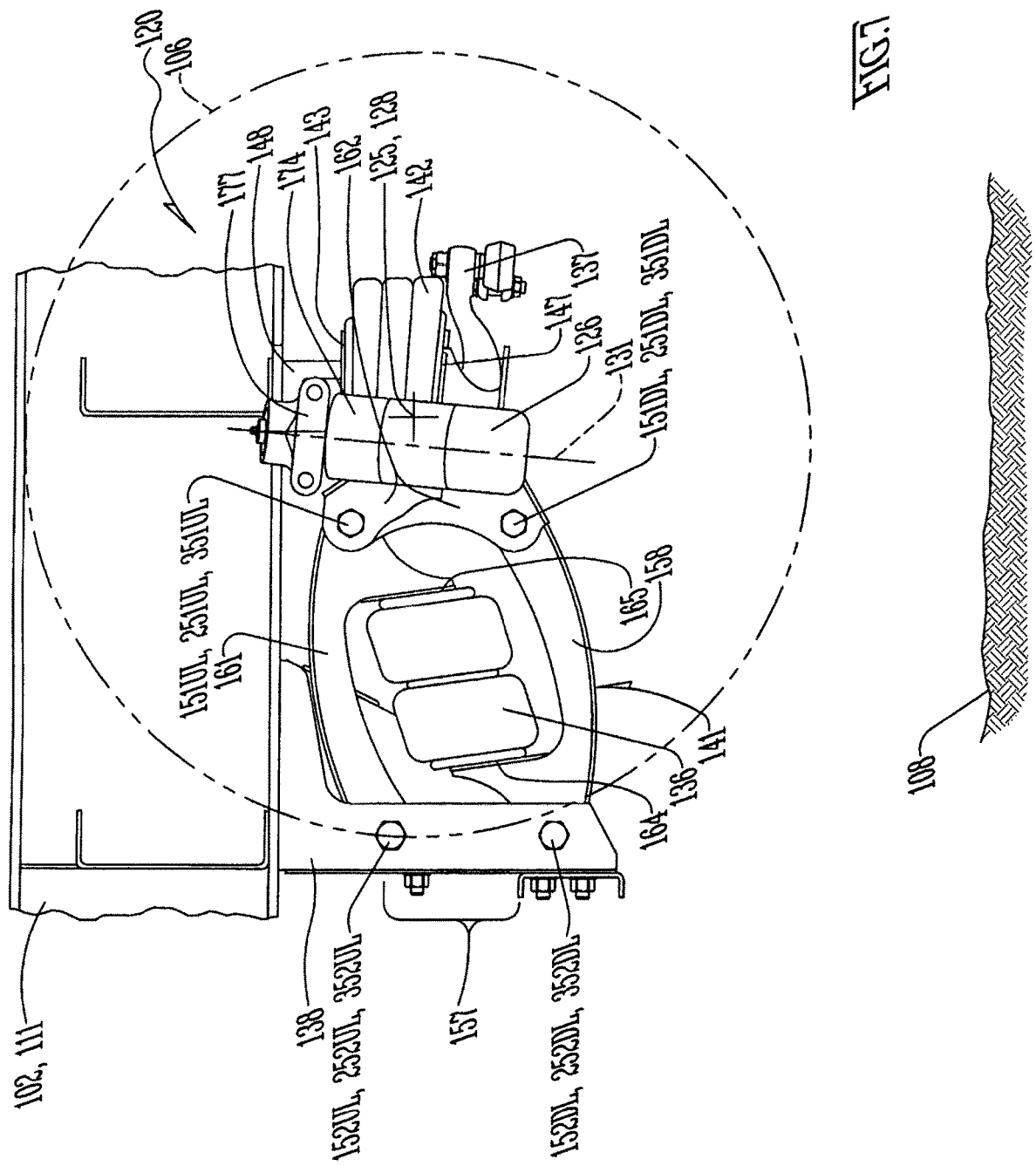
FIG. 7 is a side elevation view taken in the direction of arrows VII-VII in FIG. 2, showing the auxiliary liftable, steerable (self-steering) axle in accordance with the invention in the raised (lifted) position.
Figure 8:
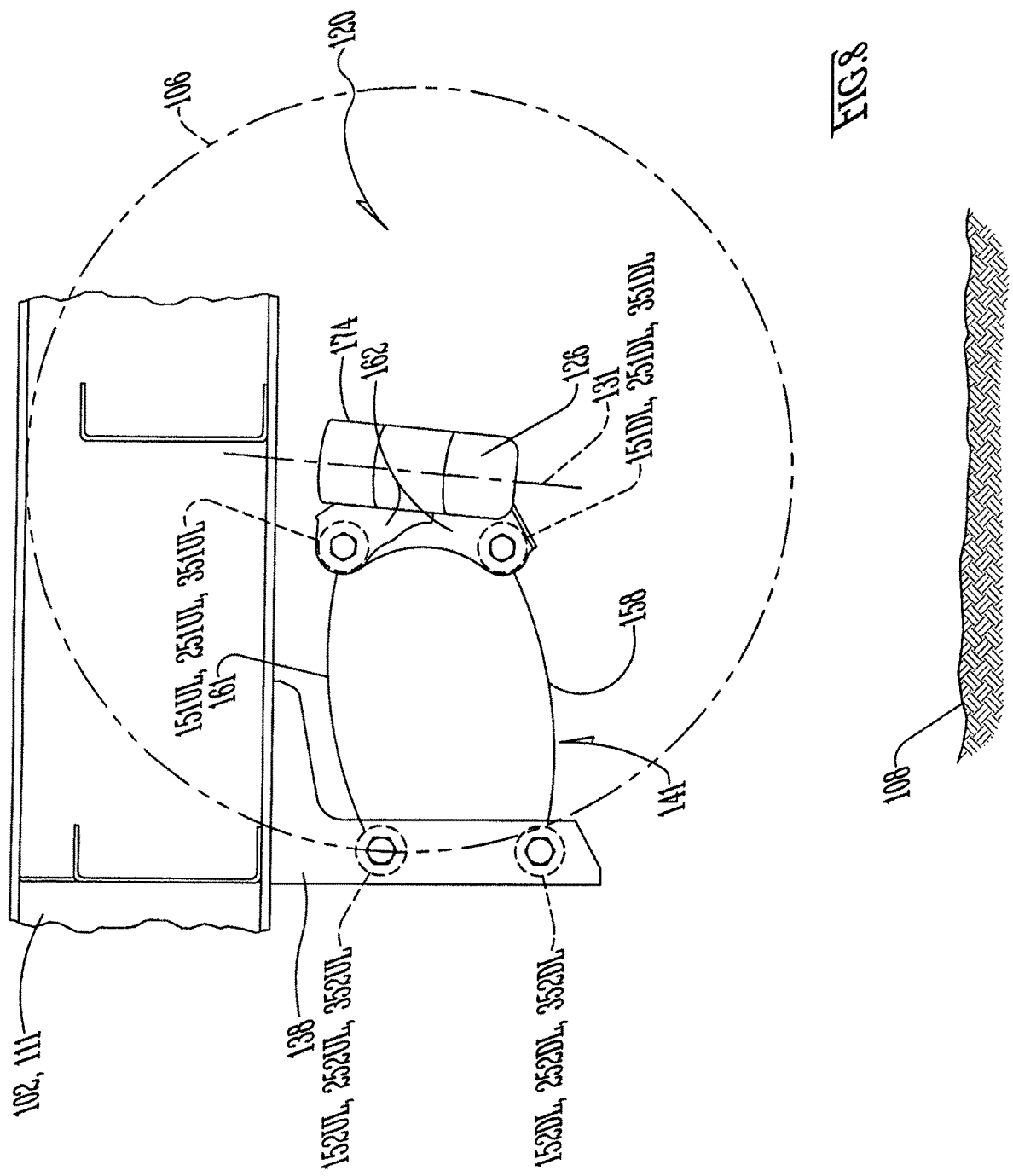
FIG. 8 is a side elevation view comparable to FIG. 7 except reduced to essentially a schematic view of the articulation axes of the suspension system to better show the eight (8) bushing sleeves of the left and right upper and lower control arms, and again where the auxiliary liftable, steerable (self-steering) axle in accordance with the invention is shown in the raised (lifted) position.
Figure 9:
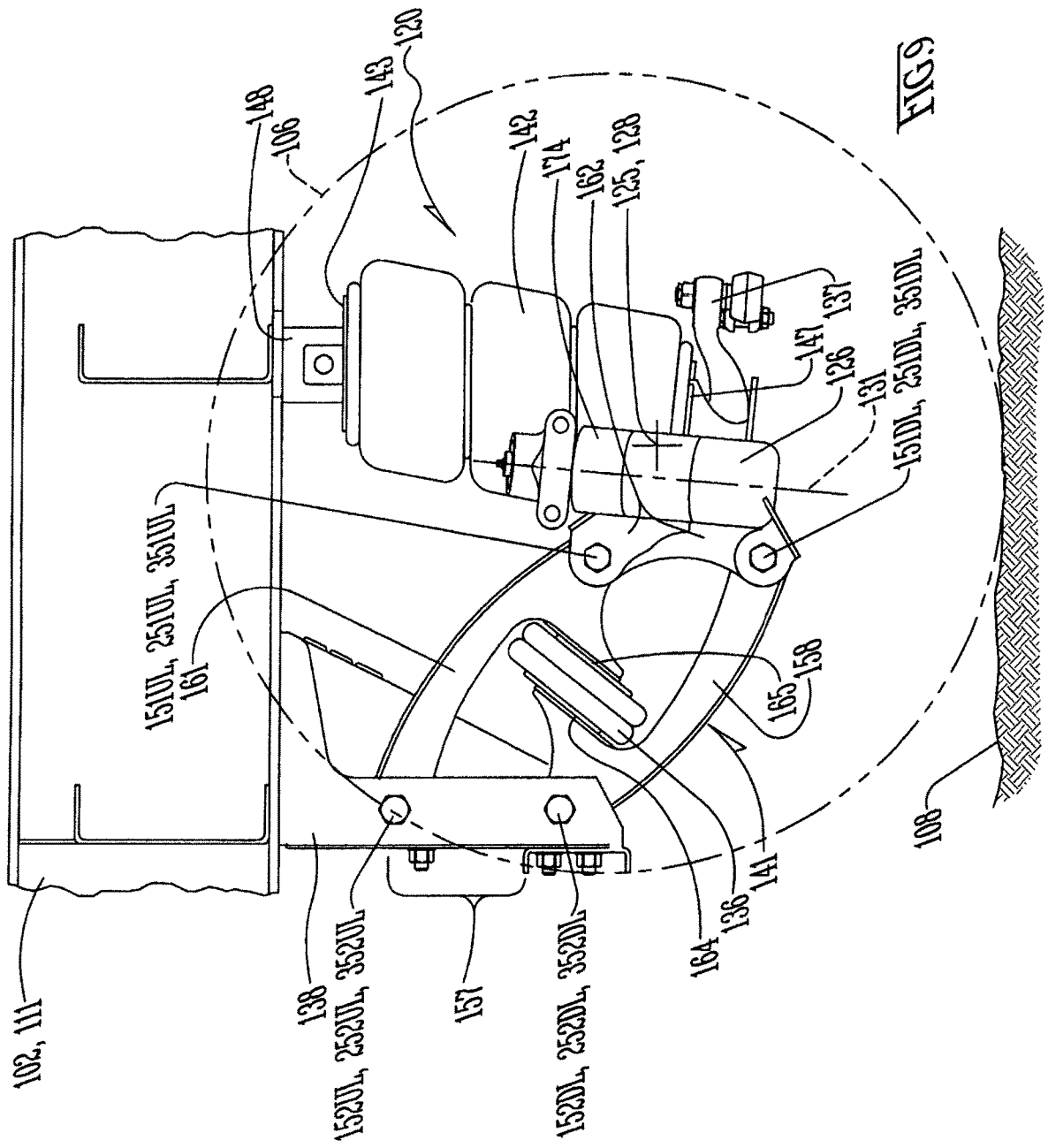
FIG. 9 is a side elevation view comparable to FIG. 7, except showing the auxiliary liftable, steerable (self-steering) axle in accordance with the invention in the lowered position.
Figure 10:
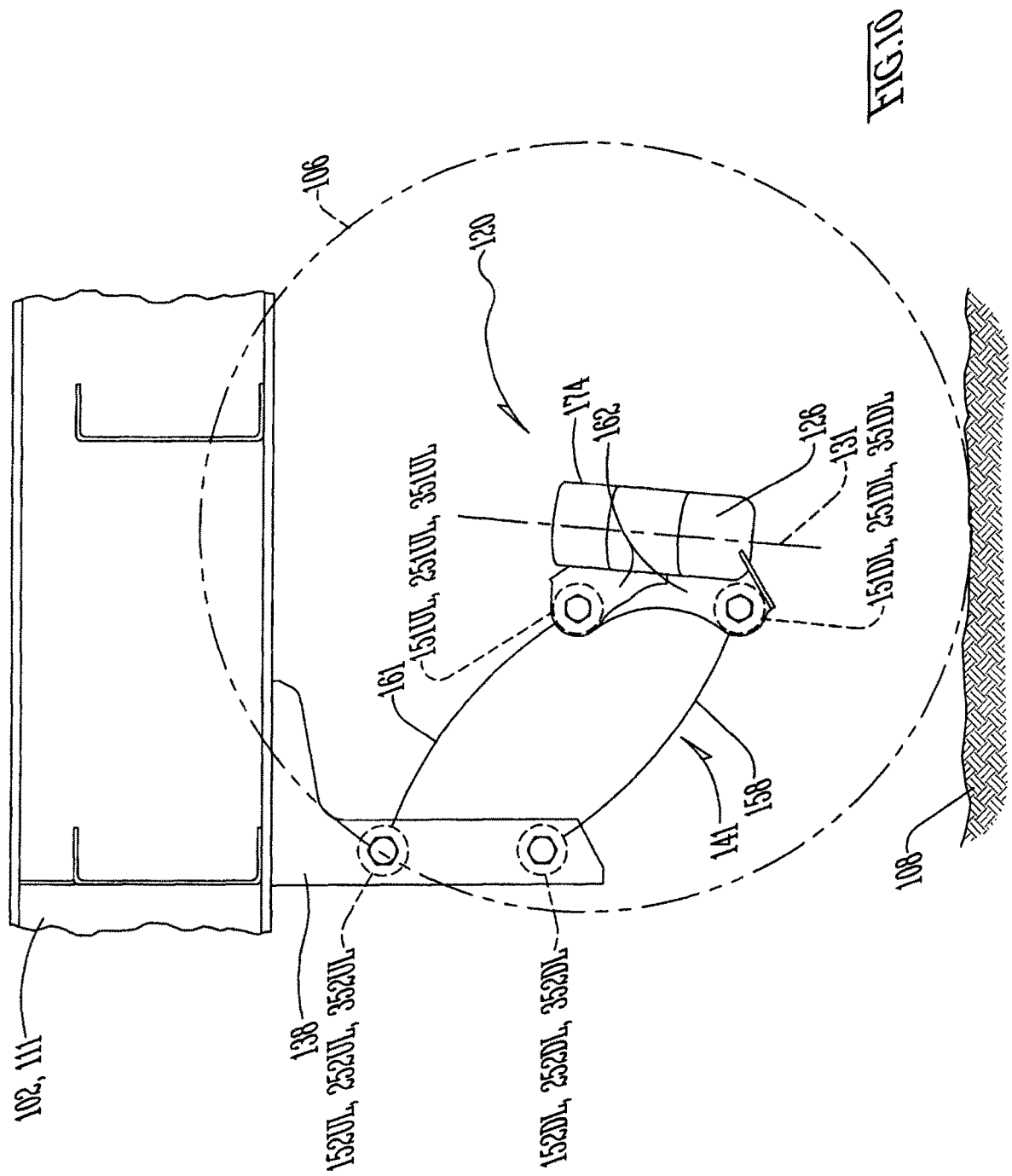
FIG. 10 is a side elevation view comparable to FIG. 8, and again reduced to essentially a schematic view of articulation axes of the suspension system to better show the eight (8) bushing sleeves of the left and right upper and lower control arms, except showing the auxiliary liftable, steerable (self-steering) axle in accordance with the invention in the lowered position.
Figure 11:
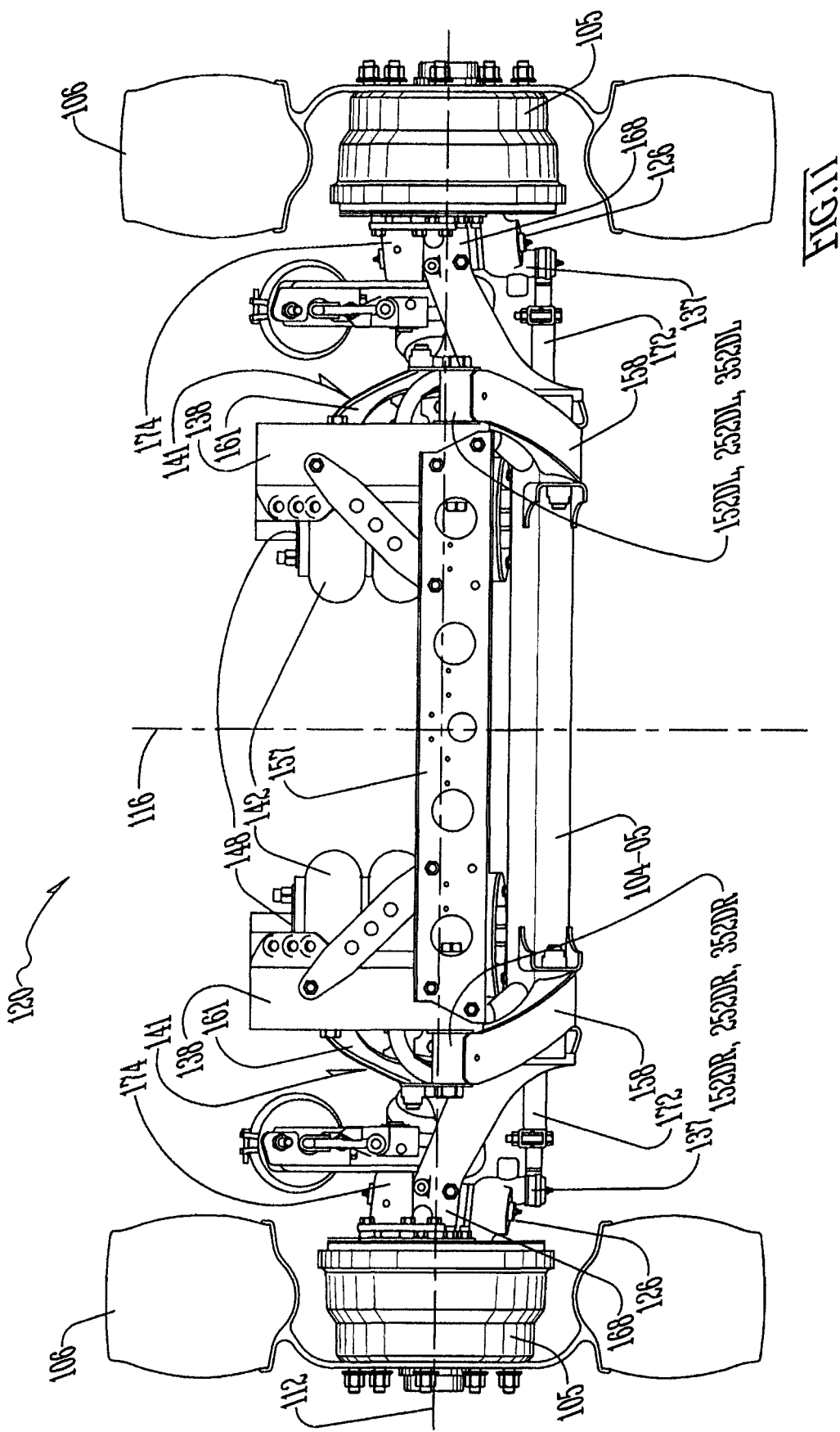
FIG. 11 is a front elevation view of FIG. 2.
Figure 12:
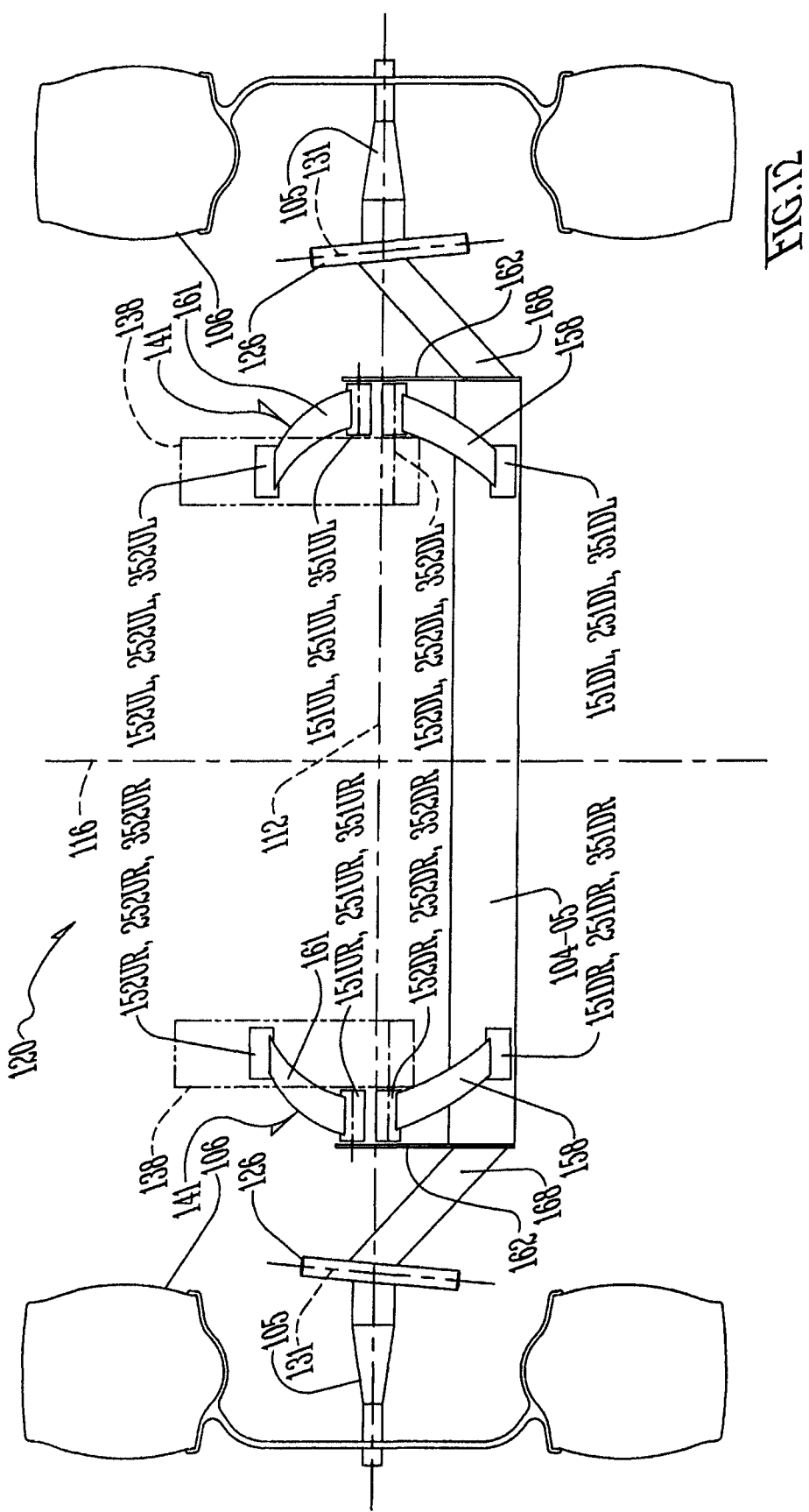
FIG. 12 is a front elevation view comparable to FIG. 11 except reduced to essentially a schematic view of articulation axes of the suspension system to better show the eight (8) bushing sleeves of the left and right upper and lower control arms as well as to show the left and right pivot axes for the left and right kingpins as well as to show the left and right tire-rotation axes for the spindles of the left and right tires.
Figure 13:
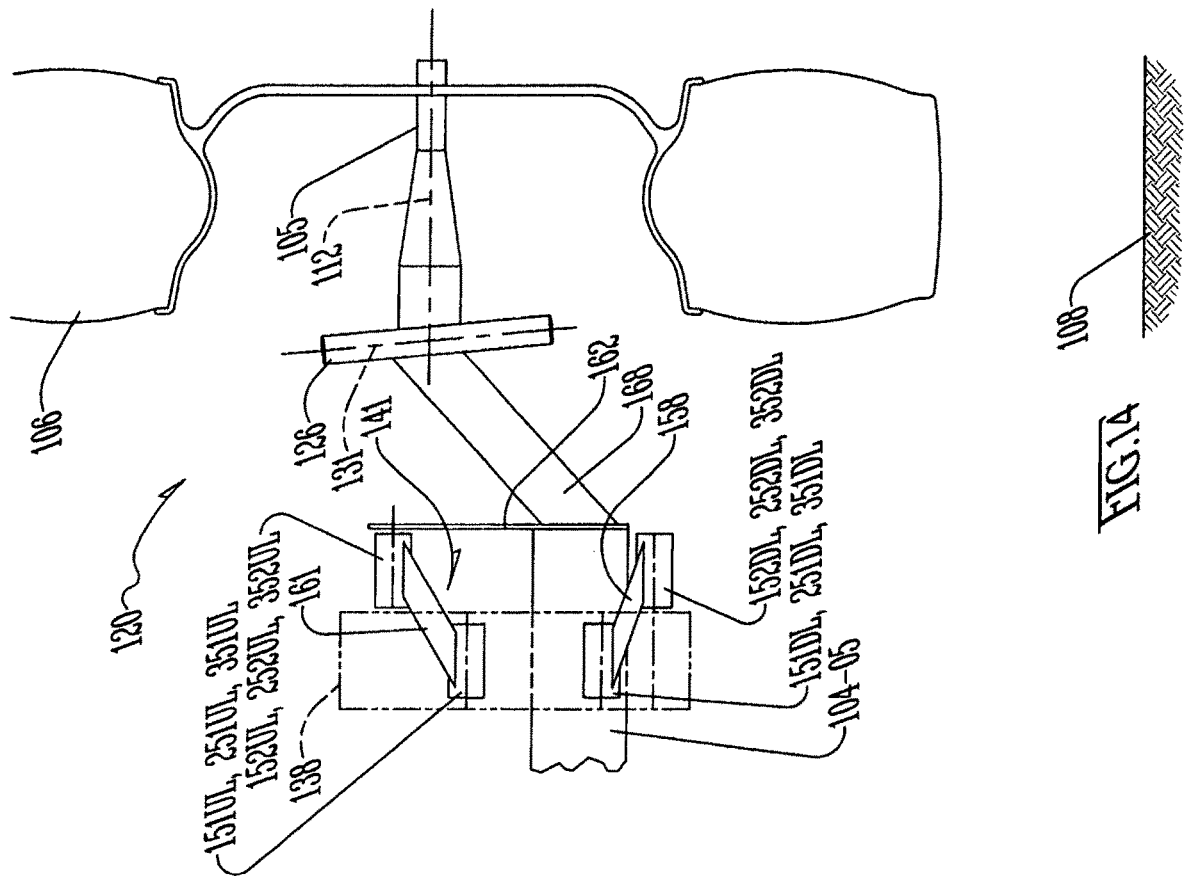
FIG. 13 is an enlarged-scale front elevation view of right half of FIG. 12 (left or port or US driver-side half of the suspension system), showing the auxiliary liftable, steerable (self-steering) axle in accordance with the invention in the lowered position.
Figure 14:
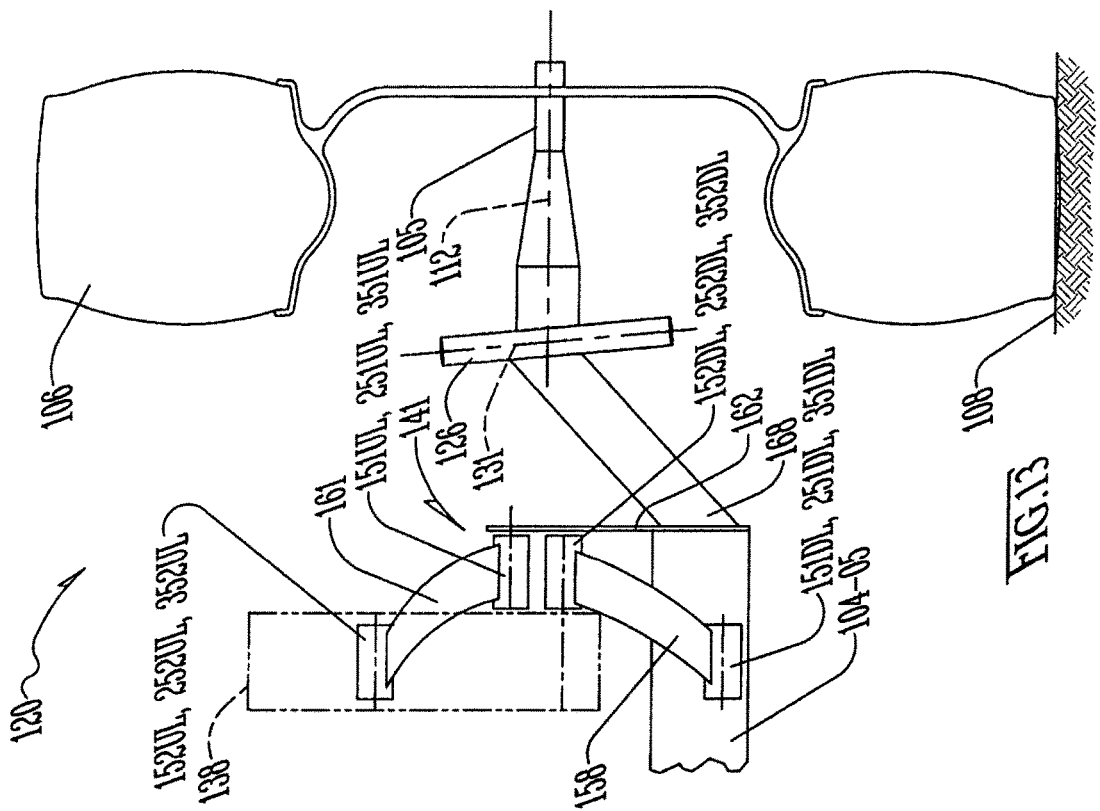
FIG. 14 is a front elevation view comparable to FIG. 13 except showing the auxiliary liftable, steerable (self-steering) axle in accordance with the invention in the raised (lifted) position.
Figure 15:
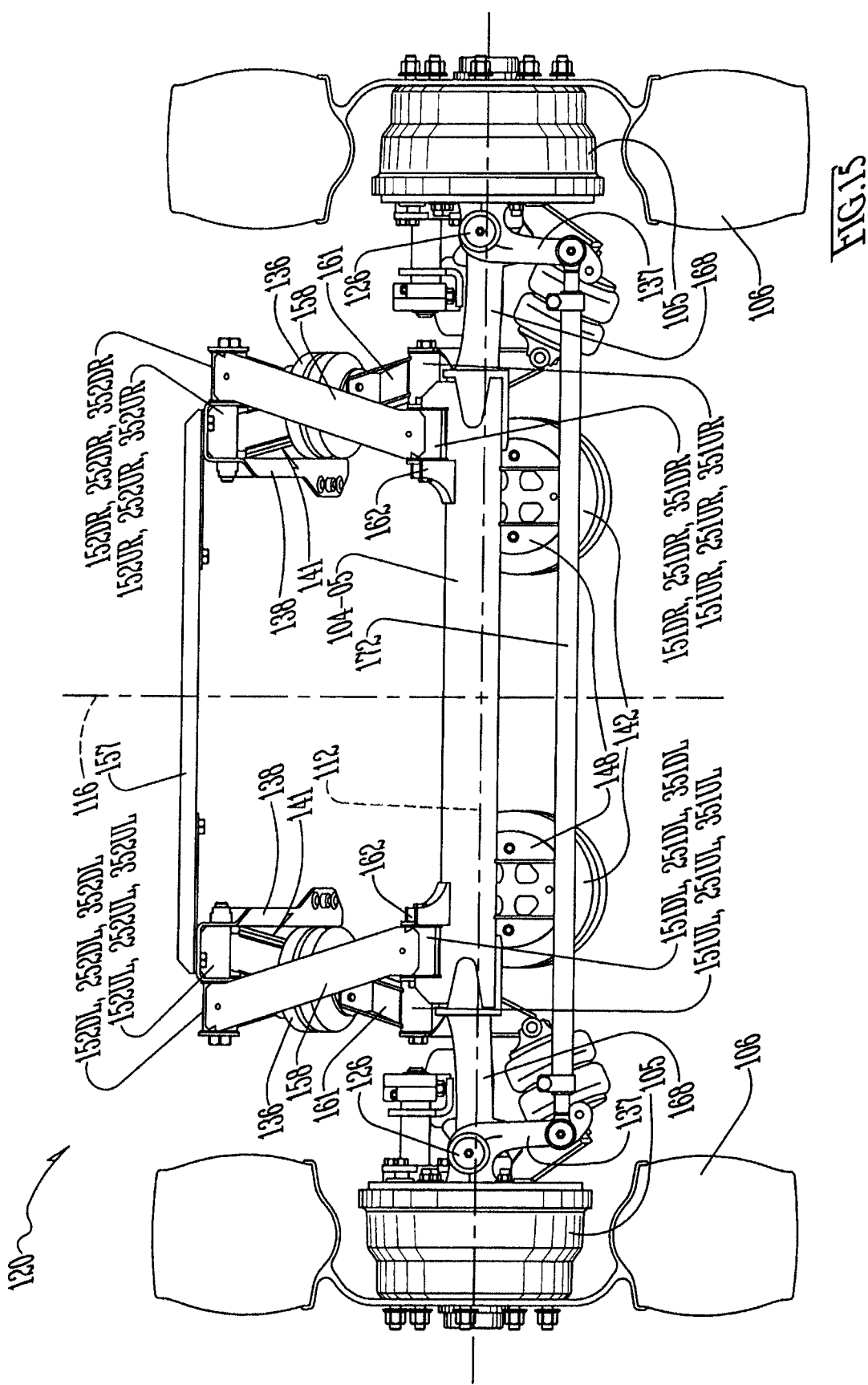
FIG. 15 is a bottom plan view of FIG. 2.
Figure 16:
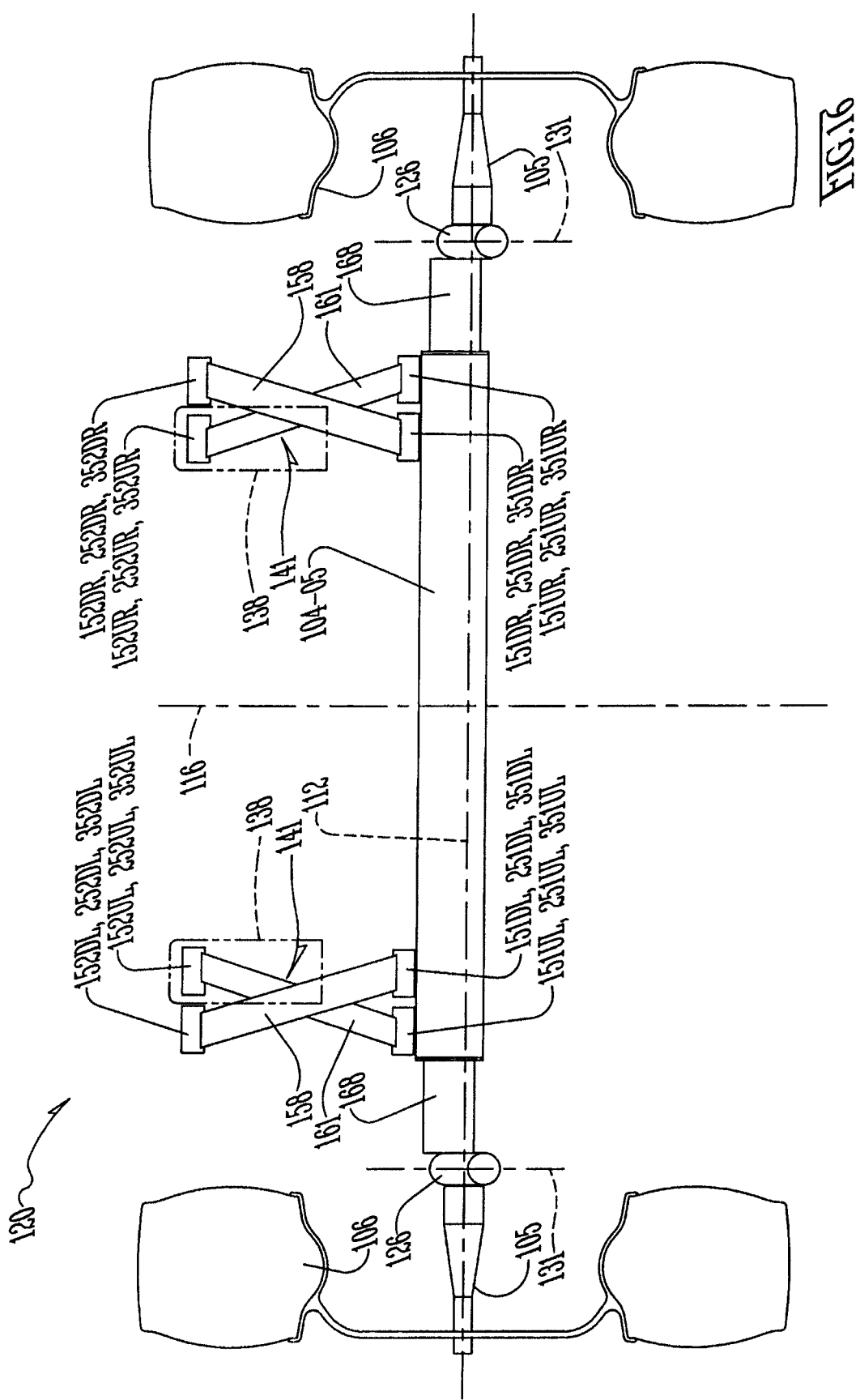
FIG. 16 is a bottom plan view comparable to FIG. 15 except reduced to essentially a schematic view of articulation axes of the suspension system to better show the eight (8) bushing sleeves of the left and right upper and lower control arms as well as to show the left and right pivot axes for the left and right kingpins as well as to show the left and right tire-rotation axes for the spindles of the left and right tires.

FIGS. 2-16 show an auxiliary suspension package 120 in accordance with the invention.

The suspension package 120 is oriented in reference to the vehicle 102 having a longitudinal axis 116 corresponding to straight line travel over a straight roadway, and a lateral axis 112 perpendicular thereto.

The suspension package 120 comprises a left and right laterally spaced hanger brackets 138 for mounting under the frame or frame members 111 of a heavy vehicle 102, a laterally elongated axle 104-05 having a central non-steerable portion 104 flanked by laterally-spaced left and right steerable wheel hubs 105, left and right laterally spaced control arm sets 141 extending between the hanger brackets 138 and axle 104-05, laterally spaced left and right load air springs 142 situated between the axle 104-05 and the frame or frame members 111 of a heavy vehicle 102, and (again) the left and right steerable wheel hubs 105.

More particularly, the auxiliary suspension package 120 can be characterized by the following:

- 102, vehicle/truck, conventional heavy-duty vehicle, dump truck (eg., specific example);
- 104-05, axle, auxiliary, having:
  - 104, a laterally elongated non-steerable central portion, and
  - 105, flanking steerable outboard wheel hubs;
- 106, wheels/tires (unpowered caster wheels/tires);
- 108, pavement/tire-travel ground plane;
- 111, frame of vehicle 102, frame members (eg., some portion of the vehicle 102);
- 113, axle, front steering axle;
- 114, axle, tandem (two) rear 'primary' axles;
- 116, forward orientation, straight line motion axis, straight line travel axis;
- 117, wheels/tires, front steering axle 113;
- 118, wheels/tires, tandem (two) rear 'primary' axles 114;
- 120, auxiliary suspension package;
- 122, semi-tractor;
- 123, dump box;
- 125, caster offset distance: namely, the small amount of offset distance between (1) the axis 131 through the kingpin 126 (which is a nearly vertical shaft) and (2) the center axis 128 of the caster wheel/tire 106;
- 126, kingpin, (or that is, the nearly vertical shaft);
- 128, center axis of the caster wheel/tire 106;
- 129, steering knuckle;
- 131, kingpin axis;
- 106, tire, caster wheel
- 136, lift air springs;
- 137, link, steering knuckle 129's steering link 137;
- 138, hanger brackets, left and right laterally spaced;
- 141, control arm sets, left and right laterally spaced (which are also four-bar mechanisms);
- 142, load air springs, laterally spaced left and right;
- 147, air spring seats (axle 104 or bottom) for the load air springs 142, laterally spaced left and right;
- 148, air spring seats (top-end or vehicle 102/111) for the load air springs, laterally spaced left and right;
- 151, end/margin of control arm 158 or 161 engaged in a load bearing connection to the axle 104;
- 152, opposite end/margin of control arm 158 or 161 engaged in load-bearing connection to the hanger bracket 138;
- 157, ground link of one or the other of the control arm sets 141 (not earth ground, but 'ground' relative to the four bar system);
- 158, control arm, lower (eg., a crank link), (one of vertically spaced pair);
- 161, control arm, upper (eg., a crank link), (other of the vertically spaced pair);
- 162, driven link/fourth link of one or the other of the control arm sets 141;
- 164, air spring seat, lift air springs 136, lower control arm 158;
- 165, air spring seat, lift air springs 136, upper control arm 161;
- 105, hubs, for left and right laterally spaced steerable wheels;
- 168, ends, left and right, of the elongated non-steerable central portion 104 of the steerable axle 104-05;
- 104, 137, 172, damper four bar system:
  - 104, the elongated non-steerable central portion 104 of the steerable axle 104-05 is the relative ground link,
  - 137, the steering links 137 of the steering knuckles 129 serve as the cranks,
  - 137, base ends, steering knuckles,
  - 131, stationary axes, kingpins, and
  - 172, tie bar, serves as the floating or driven link;
- 174, housing bosses, kingpin; and
- 177, outboard faces, steering knuckle.

General aspects of the invention can be generalized and/or include as follows.

It is an aspect of the invention that the suspension system 120 for liftable steerable axles 104-05 has the following:
preferably a pair of steering knuckles 129;
preferably a pair of pistonless bellows load air springs 142 (ie., damper air springs);
preferably a pair of pistonless bellows lift air springs 136;
a steerable axle structure 120 that has, at each end, a kingpin housing boss 174, a kingpin 126 fixed into the kingpin boss 174, and a pair of steering knuckles 129 that rotate around the kingpin 126 and are supported by the kingpin housing 174;
wherein the steering knuckles 129 are connected at the bottom of each other by the respective steering links 137 thereof side to side by a tie rod assembly 172 so that the steering knuckles 129 respond to each others rotational inputs.

The load air springs 142 dampen road inputs. Pressurizing the lift air springs 136 and de-pressurizing the load air springs 142 raises (and perhaps locks) the liftable steerable axle 104-05 in a lifted position (ie., lifted off and clear of the pavement 108, or tire-travel ground plane, of any composition). In the opposite direction (ie., de-pressurizing the lift air springs 136 and pressurizing the load air springs 142) the liftable steerable axle 104-05 would be lowered and locked in a pavement-engaging position, ready for service for freighting load-bearing duty.

The lift and load air springs 136 and 142 are pressurized with regulated air. This regulated air can be supplied from a neutral tank supply.

Alternatively, it is an alternative aspect of the invention that a suspension system 120 for liftable steerable axles 104-05 would include:
laterally spaced left and right steering knuckles 129;
laterally spaced left and right pistonless bellows load air springs 142;
laterally spaced left and right pistonless bellows lift air springs 136;
a steerable axle structure 120 that has, at a laterally spaced left and right end thereof, a respective left and right kingpin housing boss 174, a respective left and right kingpin 126 fixed into the respective left and right kingpin boss 174, and a respective left and right steering knuckles 129 that rotate around the respective left and right kingpin 126 and are supported by the respective left and right kingpin housing 174;

wherein the steering knuckles 129 are connected at the bottom of each other by the respective steering links 137 thereof side to side by a tie rod assembly 172 so that the steering knuckles 129 respond to each others rotational inputs;

left and right laterally spaced hanger brackets 138 for mounting under the frame or frame members 111 of a heavy vehicle 102;

left and right laterally spaced control arm sets 141 extending between the respective left and right hanger brackets 138 and the elongated non-steerable central portion 104 of the sole steerable axle 104-05;

each control arm set 141 comprising an upper control arm 161 and spaced lower control arm 158;

each control arm 161 and 158 extending between (1) a forward pivot-connection end 152UL, 152UR, 152DL, 152DR adapted to receive a resilient bushing and pivot pin assemblage 252UL, 252UR, 252DL, 252DR and (2) rearward pivot-connection end 151UL, 151UR, 151DL, 151DR adapted to receive a resilient bushing and pivot pin assemblage 251UL, 251UR, 251DL, 251DR;

each hanger bracket 138 providing an upper pivot-connection set position 352UL/352UR and a lower pivot connection set position 352DL/352DR, wherein one or the other of the upper or lower pivot-connection set position 352UL/352UR or 352DL/352DR is relatively inboard of the other of the lower or upper set of pivot-connection set positions 352DL/352DR or 352U/352U and therein being relatively outboard;

the axle 104 providing four pivot-connection set positions 351UL, 351UR, 351DL, 351DR comprising a laterally-spaced left and right lower pivot-connection set position 351DL and 351DR and a laterally-spaced left and right upper pivot-connection set position 351UL and 351UR;

wherein one or the other of the axle-right upper or lower pivot-connection set position 351UR or 351DR is relatively inboard of the other of the axle-right lower or upper set of pivot-connection set positions 351DR or 351UR and therein being relatively outboard;

wherein one or the other of the axle-left upper or lower pivot-connection set position 351UL or 351DL is relatively inboard of the other of the axle-left lower or upper set of pivot-connection set positions 351DL 351UL;

eight resilient bushing and pivot pin assemblages 252UL, 252UR, 252DL, 252DR, 251UL, 251UR, 251DL and 251DR wherein:

a first bushing and pivot pin assemblage (eg., 252UL) pivotally connects the forward pivot-connection end 152UL of the left upper control arm 161 to either the upper or lower pivot-connection set positions 352UL or 352DL of the left hanger bracket 138;

a second bushing and pivot pin assemblage (Eg., 252DL) pivotally connects the forward pivot-connection end 152DL of the left lower control arm 158 to the other of the upper or lower pivot-connection set positions 352UL or 352DL of the left hanger bracket 138;

a third bushing and pivot pin assemblage (eg., 252UR) pivotally connects the forward pivot-connection end 152UR of the right upper control arm 161 to either the upper or lower pivot-connection set positions 352UR or 352DL of the right hanger bracket 138;

a fourth bushing and pivot pin assemblage pivotally (eg., 252DR) connects the forward pivot-connection end 152DR of the right lower control arm 158 to the other of the upper or lower pivot-connection set positions 352UR or 352DL of the right hanger bracket 138;

a fifth bushing and pivot pin assemblage (eg., 251UL) pivotally connects the rearward pivot-connection end 151UL of the left upper control arm 161 to either the upper or lower left-side pivot-connection set positions 351UL or 351DL on the axle 104;

a sixth bushing and pivot pin assemblage (eg., 251DL) pivotally connects the rearward pivot-connection end 151DL of the left lower control arm 158 to the other of the upper or lower left-side pivot-connection set positions 351UL or 351DL of the axle 104;

a seventh bushing and pivot pin assemblage pivotally (eg., 251UR) connects the rearward pivot-connection end 151UR of the right upper control arm 161 to either the upper or lower right-side pivot-connection set positions 351UR or 351UD of the axle 104; and an eighth bushing and pivot pin assemblage (eg., 251DR) pivotally connects the rearward pivot-connection end 151DR of the right lower control arm 158 to the other of the upper or lower right-side pivot-connection set positions 351UR or 351UD of the axle 102;

wherein the lower and upper control arms 158 and 161 of each control arm set 141 respectively cross under and over each other relatively X-configured or X-disposed relative each other in plan view;

wherein the forward pivot-connection (eg., 152UL) of the upper control arm 161 of each control arm set 141 (eg., the left control arm set 141 and the left upper control arm 161) makes a pivot connection with either the inboard or outboard pivot-connection set positions 352UL or 352DL of the respective hanger bracket 138 (eg., left hanger bracket 138) as the forward pivot-connection (eg., 152DL) of the lower control arm 158 of that control arm set 141 (eg., the left control arm set 141 and the left lower control arm 158) makes a pivot connection with other of the inboard or outboard pivot-connection set positions 352UL or 352DL of the respective hanger bracket 138 (eg., left hanger bracket 138); and wherein the rearward pivot-connection of (eg., 151DL) the upper control arm 161 of each control arm set 141 (eg., the left control arm set 141 and the left upper control arm 161) makes a pivot connection with either the inboard or outboard pivot-connection set positions 351UL or 351DL of the respective left or right-side of the axle 104 as the rearward pivot-connection (eg., 151DL) of the lower control arm 158 of each control arm set 141 (eg., the left control arm set 141 and the left lower control arm 158) makes a pivot connection with other of the inboard or outboard pivot-connection set positions 351UL or 351DL of the respective left or right-side of the axle 104.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A suspension system for liftable steerable axles, comprising:

laterally spaced left and right steerable knuckles;

laterally spaced left and right pistonless bellows load air springs;

laterally spaced left and right pistonless bellows lift air springs;

a steerable axle structure that has, at a laterally spaced left and right end thereof, a respective left and right kingpin housing boss, and a respective left and right kingpin fixed into the respective left and right kingpin boss, wherein the respective left and right steerable knuckles rotate around the respective left and right kingpin and are supported by the respective left and right kingpin housing;

wherein the steerable knuckles are connected to each other side to side by a tie rod assembly whereby the steerable knuckles respond to rotational inputs from each respective knuckle;

left and right laterally spaced hanger brackets for mounting suspending under a frame or frame members of a heavy vehicle;

left and right laterally spaced control arm sets extending between the respective left and right hanger brackets and the steerable axle;

each control arm set comprising an upper control arm and a spaced lower control arm;

each control arm extending between (1) a forward pivot-connection end adapted to receive a resilient bushing and pivot pin assemblage and (2) a rearward pivot-connection end adapted to receive a resilient bushing and pivot pin assemblage;

each hanger bracket providing an upper pivot-connection set position and a lower pivot connection set position, wherein one or the other of the upper or lower pivot-connection set positions is inboard of the other of the lower or upper pivot-connection set positions and therein being relatively outboard;

and right lower pivot connection set position and a laterally-spaced left and right upper pivot connection set position;

wherein one or the other of the axle-right upper or lower pivot-connection set positions is relatively inboard of the other of the axle-right lower or upper pivot-connection set positions and therein being relatively outboard;

wherein one or the other of the axle-left upper or lower pivot-connection set positions is relatively inboard of the other of the axle-left lower or upper pivot-connection set positions;

a plurality of resilient bushing and pivot pin assemblages comprising a first through eighth bushing and pivot pin assemblage, wherein:

the first bushing and pivot pin assemblage pivotally connects the forward pivot-connection end of the left upper control arm to the upper pivot-connection set positions of the left hanger bracket;

the second bushing and pivot pin assemblage pivotally connects the forward pivot-connection end of the left lower control arm to the lower pivot-connection set positions of the left hanger bracket;

the third bushing and pivot pin assemblage pivotally connects the forward pivot-connection end of the right upper control arm to the upper pivot-connection set positions of the right hanger bracket;

the fourth bushing and pivot pin assemblage pivotally connects the forward pivot-connection end of the right lower control arm to the lower pivot-connection set positions of the right hanger bracket;

the fifth bushing and pivot pin assemblage pivotally connects the rearward pivot-connection end of the left upper control arm to the upper left-side pivot-connection set positions on the axle;

the sixth bushing and pivot pin assemblage pivotally connects the rearward pivot-connection end of the left lower control arm to the lower left-side pivot-connection set positions of the axle;

the seventh bushing and pivot pin assemblage pivotally connects the rearward pivot-connection end of the right upper control arm to the upper right-side pivot-connection set positions of the axle; and the eighth bushing and pivot pin assemblage pivotally connects the rearward pivot-connection end of the right lower control arm to the other of the upper or lower right-side pivot-connection set positions of the axle;

wherein the lower and upper control arms of each control arm set respectively cross under and over each other X-configured or X-disposed relative each other in plan view.

2. The suspension system for liftable steerable axles of claim 1, wherein:

the forward pivot-connection of the upper control arm of each control arm set makes a pivot connection with either the inboard or outboard pivot-connection set positions of the respective hanger as the forward pivot-connection of the lower control arm of each control arm set makes a pivot connection with the other of the inboard or outboard pivot-connection set positions of the respective hanger.

3. The suspension system for liftable steerable axles of claim 2, wherein:

the rearward pivot-connection of the upper control arm of each control arm set makes a pivot connection with either the inboard or outboard pivot-connection set positions of the respective left or right-side of the axle as the rearward pivot-connection of the lower control arm of each control arm set makes a pivot connection with the other of the inboard or outboard pivot-connection set positions of the respective left or right-side of the axle.

4. The suspension system for liftable steerable axles of claim 1, further comprising:

the pair of laterally-spaced pistonless bellows lift air springs for lifting the steerable axle and thereby lifting steerable tires off and clear of the pavement or tire-travel ground;

wherein each hanger bracket and respective control arm set cooperatively comprise a four-bar mechanism and has one of the pistonless bellows lift air springs arranged within the four-bar mechanism such that the extension stroke of the pistonless bellows lift air spring is harnessed for lifting service.

5. The suspension system for liftable steerable axles of claim 4, wherein:

the four-bar mechanism comprises a ground link, an upper and a lower crank link, and a floating link all pivotally connected in a loop;

wherein the ground link comprises a vertical span of the hanger bracket;

the upper and lower crank links comprise the upper and lower control arms respectively;

the floating link comprises a vertical span associated with the steerable axle;

the lower crank link has a rear facing, upwardly extending air-spring seat;

the upper crank has a forward facing, downwardly extending air-spring seat; and the lift air spring is disposed between respective air-spring seats.

6. The suspension system for liftable steerable axles of claim 1, further comprising:

a four-bar linkage arrangement that includes a given lateral span of the steerable axle;

the four-bar linkage arrangement comprising a ground link, a left and right crank link, and a driven link; wherein:

the ground link comprises the given lateral span of the steerable axle;

the driven link comprises a given lateral span of the tie rod;

the left and right crank links comprise left and right extensions of the left and right steerable knuckles respectively, which extensions are elongated and terminate in distal ends coupled to left and right laterally spaced positions relative to the tie rod.

7. The suspension system for liftable steerable axles of claim 6, further comprising:

left and right pistonless bellows centering air springs which, when the heavy vehicle is moving forward, are relatively pressurized/depressurized to a state whereby allowing the steerable caster tires to self-steer or swivel relatively clockwise or counterclockwise;

wherein the centering air springs are linked into a valve that gets a vehicle backup signal so that, when backing up, the centering air springs are sent high pressure so as to force the centering air springs to center straight the steerable knuckles and thus center the caster tires for backing up.

8. A suspension system for liftable steerable axles, comprising:

laterally spaced left and right steerable knuckles;

laterally spaced left and right pistonless bellows load air springs;

laterally spaced left and right pistonless bellows lift air springs;

a steerable axle structure that has, at a laterally spaced left and right end thereof, a respective left and right kingpin housing boss, and a respective left and right kingpin fixed into the respective left and right kingpin boss, wherein the respective left and right steerable knuckles rotate around the respective left and right kingpin and are supported by the respective left and right kingpin housing;

wherein the steerable knuckles are connected to each other side to side by a tie rod assembly whereby the steerable knuckles respond to rotational inputs from each respective knuckle;

left and right laterally spaced hanger brackets for mounting suspending under a frame or frame members of a heavy vehicle;

left and right laterally spaced control arm sets extending between the respective left and right hanger brackets and the steerable axle;

each control arm set comprising an upper control arm and a spaced lower control arm;

each control arm extending between (1) a forward pivot-connection end adapted to receive a resilient bushing and pivot pin assemblage and (2) a rearward pivot-connection end adapted to receive a resilient bushing and pivot pin assemblage;

each hanger bracket providing an upper pivot-connection set position and a lower pivot connection set position, wherein one or the other of the upper or lower pivot-connection set positions is inboard of the other of the lower or upper pivot-connection set positions and therein being relatively outboard;

the axle providing four pivot-connection set positions comprising a laterally-spaced left and right lower pivot connection set position and a laterally-spaced left and right upper pivot connection set position;

wherein one or the other of the axle-right upper or lower pivot-connection set positions is relatively inboard of the other of the axle-right lower or upper pivot-connection set positions and therein being relatively outboard;

wherein one or the other of the axle-left upper or lower pivot-connection set positions is relatively inboard of the other of the axle-left lower or upper pivot-connection set positions; and wherein the lower and upper control arms of each control arm set respectively cross under and over each other X-configured or X-disposed relative each other in plan view.

9. The suspension system for liftable steerable axles of claim 8, wherein:

the forward pivot-connection of the upper control arm of each control arm set makes a pivot connection with either the inboard or outboard pivot-connection set positions of the respective hanger as the forward pivot-connection of the lower control arm of each control arm set makes a pivot connection with the other of the inboard or outboard pivot-connection set positions of the respective hanger.

10. The suspension system for liftable steerable axles of claim 9, wherein:

the rearward pivot-connection of the upper control arm of each control arm set makes a pivot connection with either the inboard or outboard pivot-connection set positions of the respective left or right-side of the axle as the rearward pivot-connection of the lower control arm of each control arm set makes a pivot connection with the other of the inboard or outboard pivot-connection set positions of the respective left or right-side of the axle.

11. The suspension system for liftable steerable axles of claim 8, further comprising:

the pair of laterally-spaced pistonless bellows lift air springs for lifting the steerable axle and thereby lifting steerable tires off and clear of the pavement or tire-travel ground;

wherein each hanger bracket and respective control arm set cooperatively comprise a four-bar mechanism and has one of the pistonless bellows lift air springs arranged within the four-bar mechanism such that the extension stroke of the pistonless bellows lift air spring is harnessed for lifting service.

12. The suspension system for liftable steerable axles of claim 11, wherein:

the four-bar mechanism comprises a ground link, an upper and a lower crank link, and a floating link all pivotally connected in a loop;

wherein the ground link comprises a vertical span of the hanger bracket;

the upper and lower crank links comprise the upper and lower control arms respectively;

the floating link comprises a vertical span associated with the steerable axle;

the lower crank link has a rear facing, upwardly extending air-spring seat;

the upper crank has a forward facing, downwardly extending air-spring seat; and the lift air spring is disposed between respective air-spring seats.

13. A suspension system for liftable steerable axles, comprising:

laterally spaced left and right steerable knuckles;

laterally spaced left and right pistonless bellows load air springs;

laterally spaced left and right pistonless bellows lift air springs;

a steerable axle structure that has, at a laterally spaced left and right end thereof, a respective left and right kingpin housing boss, and a respective left and right kingpin fixed into the respective left and right kingpin boss, wherein the respective left and right steerable knuckles rotate around the respective left and right kingpin and are supported by the respective left and right kingpin housing;

wherein the steerable knuckles are connected to each other side to side by a tie rod assembly whereby the steerable knuckles respond to rotational inputs from each respective knuckle;

left and right laterally spaced hanger brackets for mounting suspending under a frame or frame members of a heavy vehicle;

left and right laterally spaced control arm sets extending between the respective left and right hanger brackets and the steerable axle;

each control arm set comprising an upper control arm and a spaced lower control arm;

each control arm extending between (1) a forward pivot-connection end adapted to receive a resilient bushing and pivot pin assemblage and (2) a rearward pivot-connection end adapted to receive a resilient bushing and pivot pin assemblage;

each hanger bracket providing an upper pivot-connection set position and a lower pivot connection set position, wherein one or the other of the upper or lower pivot-connection set positions is inboard of the other of the lower or upper pivot-connection set positions and therein being relatively outboard;

and right lower pivot connection set position and a laterally-spaced left and right upper pivot connection set position;

wherein one or the other of the axle-right upper or lower pivot-connection set positions is relatively inboard of the other of the axle-right lower or upper pivot-connection set positions and therein being relatively outboard;

wherein one or the other of the axle-left upper or lower pivot-connection set positions is relatively inboard of the other of the axle-left lower or upper pivot-connection set positions; and further comprising a four-bar linkage arrangement that includes a given lateral span of the steerable axle;

the four-bar linkage arrangement comprising a ground link, a left and right crank link, and a driven link; wherein:

the ground link comprises the given lateral span of the steerable axle;

the driven link comprises a given lateral span of the tie rod;

the left and right crank links comprise left and right extensions of the left and right steerable knuckles respectively, which extensions are elongated and terminate in distal ends coupled to left and right laterally spaced positions relative to the tie rod.

14. A suspension package for liftable steerable axles for heavy vehicles, comprising:

left and right laterally spaced hanger brackets adapted for mounting under a frame or frame members of a heavy vehicle;

a laterally elongated axle having a central non-steerable portion flanked by laterally-spaced left and right steerable wheel hubs;

left and right laterally spaced control arm sets extending longitudinally between the respective left and right hanger brackets and the axle;

each control arm set comprising an upper control arm and a spaced lower control arm;

each of the upper and lower control arm having a forward end or margin being connected in a pivotal load-bearing connection at respectively vertically-spaced set positions on the respective left or right hanger bracket;

each of the upper and lower control arm having a trailing end or margin being connected in a pivotal load-bearing connection at respectively vertically-spaced set positions on the axle at respectively laterally spaced left or right set-position sets on the axle;

wherein the lower and upper control arms of each control arm set respectively cross under and over each other X-configured or X-disposed relative each other in plan view.

15. The suspension system for liftable steerable axles of claim 14, wherein:

the axle provides four pivot-connection set positions comprising a laterally-spaced left and right lower pivot connection set position and a laterally-spaced left and right upper pivot connection set position;

wherein one or the other of the axle-right upper or lower pivot-connection set positions is inboard of the other of the axle-right lower or upper pivot-connection set positions and therein being outboard; and wherein one or the other of the axle-left upper or lower pivot-connection set positions is inboard of the other of the axle-left lower or upper pivot-connection set positions.

16. The suspension system for liftable steerable axles of claim 14, further comprising:

a pair of laterally-spaced pistonless bellows lift air springs for lifting the steerable axle and thereby lifting steerable tires off and clear of the pavement or tire-travel ground;

wherein each hanger bracket and respective control arm set cooperatively comprise a four-bar mechanism and has one of the pistonless bellows lift air springs arranged within the four-bar mechanism such that the pistonless bellows lift air spring's extension stroke is harnessed for lifting service.

17. The suspension system for liftable steerable axles of claim 16, wherein:

the four-bar mechanism comprises a ground link, an upper and a lower crank link, and a floating link all pivotally connected in a loop;

wherein the ground link comprises a vertical span of the hanger bracket;

the upper and lower crank links comprise the upper and lower control arms respectively;

the floating link comprises a generally vertical span associated with the steerable axle.

18. The suspension system for liftable steerable axles of claim 17, wherein:

the lower crank link has a rear facing, upwardly extending air-spring seat;

the upper crank has a forward facing, downwardly extending air-spring seat; and the lift air spring is disposed between respective air-spring seats.

19. The suspension system for liftable steerable axles of claim 14, further comprising:

laterally spaced left and right pistonless bellows load air springs operatively positioned between the steerable axle and the frame member of the heavy vehicle.

* * * * *